United States Patent Office 3,503,966
Patented Mar. 31, 1970

3,503,966
4-ARYL-3,1-BENZOTHIAZIN-2-ONE AND 4-ARYL-3,1-BENZOTHIAZINE-2-THIONE
Werner Metlesics, Clifton, and Leo Henryk Sternbach, Upper Montclair, N.J., assignors to Hoffmann-La Roche Inc., Nutley, N.J., a corporation of New Jersey
No Drawing. Continuation-in-part of application Ser. No. 445,248, Apr. 2, 1965. This application Sept. 6, 1967, Ser. No. 665,715
Int. Cl. C07d 93/40, 93/08; A61k 27/00
U.S. Cl. 260—243   10 Claims

ABSTRACT OF THE DISCLOSURE 4-phenyl substituted-3,1-benzothiazin-2-ones and 4-phenyl substituted-3,1-benzothiazine-2-thiones. Such compounds are intermediates in the preparation of 5-phenyl substituted 4,1-benzothiazepin-2(1H)-ones, compounds having choleretic and antidepressant activities.

RELATED APPLICATIONS

This application is a continuation-in-part of U.S. patent application Ser. No. 445,248, filed on Apr. 2, 1965 in the names of Werner Metlesics and Leo Henryk Sternbach, now U.S. Patent No. 3,346,638. The benefit of this prior pending application is hereby claimed.

Also related are U.S. patent application Ser. No. 266,030 filed Mar. 18, 1963 now abandoned, U.S. patent application Ser. No. 445,264, filed Apr. 2, 1965 now abandoned and U.S. patent application Ser. No. 535,722 filed Mar. 21, 1966, and now issued as U.S. Patent No. 3,400,119 on Sept. 3, 1968 all the in names of Wilhelm Wenner and Milan Uskokovic. These cases disclose 4,1-benzothiazepines which can be prepared utilizing the said 4-phenyl substituted-3,1-benzothiazin-2-ones and 4-phenyl substituted-3,1-benzothiazine-2-thiones as intermediates.

BRIEF SUMMARY

The present invention relates to novel chemical processes and to novel intermediates useful in such novel chemical processes. More particularly, the present invention relates to novel chemical processes useful in the preparation of medicinally valuable 4,1-benzothiazepin-2-ones and to novel intermediates useful in such novel chemical processes.

DETAILED DESCRIPTION

The novel process aspect of the present invention involves (1) treating a compound of the formula

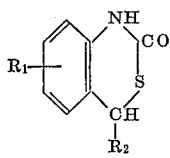

I wherein $R_1$ is selected from the group consisting of hydrogen, halogen, lower alkyl and lower alkoxy; $R_2$ is selected from the group consisting of hydrogen, lower alkyl and

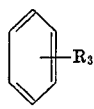

in which $R_3$ is selected from the group consisting of hydrogen and halogen, with an aqueous alkaline medium whereby to provide a compound of the formula

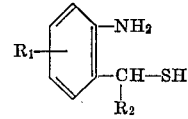

II wherein $R_1$ and $R_2$ are as above, and (2) reacting the so-formed compound of Formula II above with a compound of the formula

III wherein $R_4$ is selected from the group consisting of hydrogen and lower alkyl and X and Y are the same or different halogen atoms, preferably, one selected from the group consisting of chlorine and bromine, thereby preparing the desired benzothiazepines of the formula

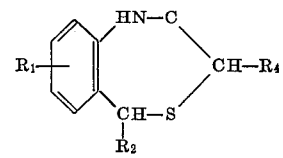

IV wherein $R_1$, $R_2$ and $R_4$ are as above.

Compounds of Formula IV above are useful in the preparation of pharmaceutically valuable compounds as well as being medicinally useful in and of themselves. Such compounds are not new with the present applicants.

The first stage of the above reaction, i.e., the preparation of compounds of Formula II above from compounds of Formula I above, proceeds in the presence of any suitable alkaline aqueous medium. Such a medium may be provided by adding an alkali metal hydroxide such as potassium hydroxide, an alkaline earth metal hydroxide or any suitable basic material, to water. Temperature and pressure are not a critical feature in the initial step of the reaction sequence illustrated above and accordingly, the reaction step can be effected at room temperature and atmospheric pressure or above room temperature and/or at elevated pressures.

The second stage in the novel process described hereinabove, i.e. the preparation of compounds of Formula IV above from the corresponding compounds of Formula II above is effected in the presence of a basic medium such as an alkali metal hydroxide in water or an alkaline earth metal hydroxide in water. Here again, temperature and pressure are not critical and thus, the reaction can be conducted at any suitable temperature and/or pressure.

In order to secure sufficient solution of the reactants in the second stages of the process of the present invention, an additional solvent which is non-miscible with water, such as an ether, e.g. diethyl ether is preferably present in the reaction medium to, for example, enhance the solubility of the starting materials, i.e., the intermediate of the Formula II and/or the end product.

Compounds of Formula I above can be prepared by a variety of reaction routes. Each of such reaction routes involve the utilization of a compound of the formula

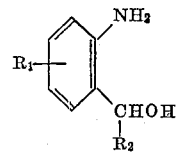

V wherein $R_1$ and $R_2$ are as above.

In one process aspect of the present invention, compounds of Formula V above are reacted with carbon disulfide in the presence of a tertiary amine and any conveniently available suitable organic solvent. Representative of tertiary amines suitable for this purpose is tri-lower alkyl amines such as triethylamine. Illustrative of preferable organic solvents are lower alkanols, such as methanol, ethanol and the like.

The resultant compounds which are of the formula

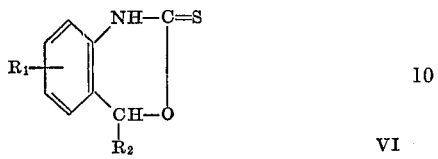

VI wherein $R_1$ and $R_2$ are as above, are then heated, preferably at about the melting point thereof, whereby to yield the corresponding compounds of Formula I above.

In yet another route for preparing compounds of Formula I above, compounds of Formula V above are reacted with carbon disulfide in the presence of a suitable alkaline material which may be an alkali metal hydroxide such as potassium hydroxide and the like and any organic solvent such as lower alkanols, e.g. methanol and ethanol and the like which will function advantageously in this aspect of the present invention. The ensuing reaction results in a compound of the formula

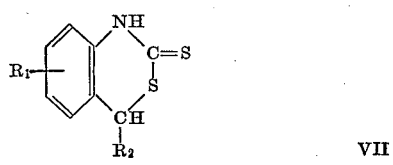

VII wherein $R_1$ and $R_2$ are as above. The so-formed compounds of Formula VII above are then treated with any suitable oxidizing system which will efficaciously effect the desired end such as one which includes hydrogen peroxide whereby to yield the corresponding compound of Formula I above.

Compounds of Formulas I, II, VI and VII above wherein $R_2$ is a

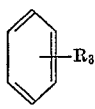

group are novel compounds and are useful in the preparative techniques outlined hereinabove. Thus, they constitute a part of the present invention.

The term "lower alkyl" as utilized throughout the instant disclosure and claims is intended to connote a straight or branched chain hydrocarbon group such as methyl, ethyl, isopropyl, butyl and the like. The term "halogen" as employed hereinabove is intended to designate all four forms thereof, i.e. chlorine, bromine, iodine and fluorine, unless otherwise stated. The expression, "lower alkoxy" as used herein represents a straight or branched chain hydrocarbon group such as methoxy and the like.

In a preferred aspect of the present invention, $R_1$ in compounds of Formula IV above is connected to the fused phenyl ring at either the 7 or the 8 position thereof.

The following examples are illustrative of the present invention, but are not limitative thereof. All temperatures stated are in degrees centigrade unless otherwise indicated.

EXAMPLE 1

A solution of 25 g. of 2-amino-5-chlorobenzohydrol, 2.5 ml. of triethylamine and 20 ml. of carbondisulfide in 250 ml. of ethanol was heated to reflux for 18 hours. The mixture was concentrated in vacuo until a crystalline precipitate appeared. On cooling, 6-chloro-1,4-dihydro-4-phenyl-2H-3,1-benzoxazine-2-thione as white needles were obtained which after recrystallization from a mixture of methylene chloride and petroleum ether melted at 197–200°.

EXAMPLE 2

A solution of 117 g. (0.5 mole) of 2-amino-5-chlorobenzohydrol in a mixture of 800 ml. of ethanol, 100 ml. of water, 100 ml. of carbondisulfide and 48 g. of potassium hydroxide was refluxed for 16 hours. It was then filtered and the filtrate concentrated in vacuo to a volume of ca. 200 ml. The so-concentrated filtrate was poured into 2000 ml. of ice water and acidified with hydrochloric acid to a pH of ca. 4–5. A crystalline precipitate was obtained which on recrystallization from a mixture of methylene chloride and petroleum ether gave 6-chloro-1,4-dihydro-4-phenyl-2H-3,1-benzothiazine - 2 - thione, as white needles melting at 156–159°.

EXAMPLE 3

To 60 ml. of an aqueous 30% solution of hydrogen peroxide cooled in an ice bath there was added 20 ml. of 5 N aqueous potassium hydroxide. To this solution was added 45 ml. of ethanol and 7.1 g. of 6-chloro-1,4-dihydro-4-phenyl-2H-3,1-benzothiazine-2-thione. The resultant suspension was stirred for 18 hours at room temperature and acidified with dilute hydrochloric acid. A solid precipitated which was collected on a filter. After recrystallization of the precipitate from methanol, there was obtained 6-chloro - 1,4 - dihydro - 4 - phenyl - 2H - 3,1 - benzothiazin-2-one as white platelets melting at 209–211°.

EXAMPLE 4

Distillation of 6-chloro-1,4-dihydro-4-phenyl-2H-3,1-benzoxazine-2-thione in a bulb tube at ca. 0.1 mm. and ca. 200° (bath temperature) gave a white solid, which after recrystallization from a mixture of methylene chloride and ether melted at 209–211°. This compound was found to be 6-chloro-1,4-dihydro-4-phenyl-2H-3,1-benzothiazin-2-one.

EXAMPLE 5

A solution of 67 g. of 6-chloro-1,4-dihydro-4-phenyl-2H-3,1-benzothiazin-2-one and 5 g. of sodium hydrosulfite ($Na_2S_2O_4$) in 500 ml. of an aqueous 20% solution of potassium hydroxide was refluxed for 4 hours. The mixture was cooled, neutralized with acetic acid and extracted with methylene chloride. The organic phase was washed with water, dried and the solvent was removed in vacuo yielding crude α-phenyl-2-amino-5-chloro-benzylmercaptan as an oil.

EXAMPLE 6

A solution of 44 g. of the crude mercaptan prepared as in Example 5 in 1050 ml. of ether was shaken with 19.9 ml. of chloroacetyl chloride and 225 ml. of 2 N sodium hydroxide. These reagents were added in turns in small portions so that the aqueous phase remained basic. A solid precipitated which was collected on a filter and after recrystallization of the precipitate from a mixture of methylene chloride and ether yielded 7-chloro-3,5-dihydro-5-phenyl-4,1-benzothiazepin-2(1H)-one as white needles melting at 221–223°.

EXAMPLE 7

To a suspension of 2.9 g. of 7-chloro-3,5-dihydro-5-phenyl-4,1-benzothiazepin-2(1H)-one, in 125 ml. of methanol was added an aqueous solution of 2.3 g. of sodium periodate. The mixture was stirred for 3 days at room temperature. A precipitate which formed was collected on a filter. The precipitate was recrystallized from a mixture of methylene chloride and methanol to yield 7 - chloro - 3,5 - dihydro - 5 - phenyl - 4,1 - benzothiazepin-2(1H)-one 4-oxide as white needles melting at 255–258°.

EXAMPLE 8

To a solution of 15 g. of 7-chloro-3,5-dihydro-5-phenyl-4,1-benzothiazepin-2(1H)-one in 100 ml. of dimethylformamide, there was added 4.8 g. of a 50% suspension of sodium hydride in mineral oil. The mixture was cooled in an ice bath and 6.3 ml. of methyl iodide was added thereto. The mixture was stirred for 15 minutes and poured into ice water. A solid precipitated which was collected on a filter and after recrystallization from a mixture of methylene chloride and ether yielded 7-chloro-3,5-dihydro-1-methyl-5-phenyl-4,1-benzothiazepin-2(1H)-one as white platelets melting at 173–175°.

EXAMPLE 9

A solution of 1 g. of 7-chloro-1,4-dihydro-4-phenyl-2H-3,1-benzothiazin-2-one and 0.1 g. of sodium hydrosulfite ($Na_2S_2O_4$) in 10 ml. of a 20% aqueous solution of potassium hydroxide was heated to reflux for 2½ hours. The mixture was cooled, neutralized with hydrochloric acid and extracted with methylene chloride yielding α-phenyl-2-amino-4-chloro benzyl mercaptan as an oil. The oil was dissolved in 30 ml. of ether and shaken with 0.25 ml. of chloroacetyl chloride and dilute sodium hydroxide. A solid precipitate formed which after recrystallization from a mixture of methylene chloride and ether gave 8-chloro-3,5-dihydro-5-phenyl-4,1-benzothiazepin - 2(1H) - one as white prisms melting at 234–236°.

EXAMPLE 10

To a solution of 12 g. of 2-amino-4-chlorobenzophenone in 40 ml. of tetrahydrofuran and 30 ml. of ethanol there was added 2.5 g. of sodium borohydride. The mixture was stirred for 16 hours at room temperature, and poured into water. White crystals of 2-amino-4-chlorobenzohydrol melting at 94–96° were obtained. The 2-amino-4-chlorobenzohydrol so obtained, was added to a solution of 4.8 g. of potassium hydroxide in 10 ml. of water and 80 ml. of ethanol. To this solution, 10 ml. of carbon disulfide was added and the mixture was heated to reflux overnight. Concentration in vacuo, neutralization with acetic acid and extraction with methylene chloride gave 7-chloro-1,4-dihydro-4-phenyl-2H-3,1-benzothiazin-2-thione as yellow crystals melting at 173–177°.

EXAMPLE 11

An aqueous solution of 9.1 g. of potassium hydroxide was added to 102 ml. of an aqueous 30% solution of hydrogen peroxide cooled in an ice bath. To this mixture was added 11.7 g. of 7-chloro-1,4-dihydro-4-phenyl-2H-3,1-benzothiazin-2-thione and 40 ml. of ethanol. This suspension was stirred for 18 hours at room temperature and acidified with hydrochloric acid. A crystalline precipitate was obtained which still contained starting material and was, therefore, treated again with hydrogen peroxide under the conditions described above. White prisms of 7-chloro - 1,4 - dihydro - 4 - phenyl - 2H - 3,1 - benzothiazin-2-one were obtained which after recrystallization from a mixture of methylene chloride and ether melted at 185–187°.

EXAMPLE 12

Dosage formulations for 4,1-benzothiazepin-2(1H)-one prepared as described herein are represented by the following.

| Suppository formulation: | Per 1.3 gm. suppository, gm. |
|---|---|
| 7-chloro-3,5-dihydro-1-methyl - 5 - phenyl-4,1-benzothiazepin-2(1H)-one | 0.025 |
| Wecobee M [1] | 1.230 |
| Carnauba wax | 0.045 |

[1] A refined pharmaceutical grade of synthetic cocoa butter, coconut derived. Available from E. F. Drew Company, New York, N.Y.

Procedure (1) The Wecobee M and the carnauba wax were melted in a suitable size glass lined container, mixed well and cooled to 45° C.

(2) Into the resultant medium, 7-chloro-3,5-dihydro-1-methyl-5-phenyl-4,1-benzothiazepin - 2(1H)-one, which had been reduced to a fine powder with no lumps, was stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packing.

EXAMPLE 13

Dosage formulations for 4,1-benzothiazepin-2(1H)-one prepared as described herein are represented by the following.

| Tablet formulation: | Per tablet, mg. |
|---|---|
| 7-chloro-3,5-dihydro-1-methyl - 5 - phenyl-4,1-benbothiazepin-2(1H) - one | 25.00 |
| Lactose, U.S.P. | 64.50 |
| Corn starch | 10.00 |
| Magnesium stearate | 0.50 |

Procedure (1) 7-chloro-3,5-dihydro-1-methyl - 5 - phenyl - 4,1-benzothiazepin-2(1H)-one was mixed with the lactose, corn starch and magnesium stearate in a suitable mixer.

(2) The mixture was further blended by passing through a Fitzpatrick comminuting machine fitted with a No. 1A screen with knives forward.

(3) The mixed powders were slugged on a tablet compressing machine.

(4) The slugs were comminuted to a suitable mesh size (No. 16 screen) and mixed well.

(5) The tablets were compressed at a tablet weight of 100 mg. using tablet punches having a diameter of approximately ¼″. (Tablets may be either flat or biconvex and may be scored if desired.)

EXAMPLE 14

Dosage formulations for 4,1-benzothiazepin-2(1H)-one prepared as described herein are represented by the following.

| Capsule formulation: | Per capsule, mg. |
|---|---|
| 7-chloro-3,5-dihydro-1-methyl - 5 - phenyl - 4,1-benzothiazepin-2(1H)-one | 50 |
| Lactose, U.S.P. | 125 |
| Corn starch, U.S.P. | 30 |
| Talc, U.S.P. | 5 |
| Total weight | 210 |

Procedure (1) 7-chloro-3,5 - dihydro - 1 - methyl-5-phenyl-4,1-benzothiazepin-2(1H)-one was mixed with lactose and corn starch in a suitable mixer.

(2) The mixture was further blended by passing through a Fitzpatrick comminuting machine with a No. 1A screen with knives forward.

(3) The blended powder was returned to the mixer, the talc added and blended thoroughly.

(4) The mixture was filled into No. 4 hard shell gelatin capsules on a Parke, Davis capsulating machine.

EXAMPLE 15

Dosage formulations for 4,1-benzothiazepin-2(1H)-one prepared as described herein are represented by the following:

Parenteral formulation

This drug was prepared in duplex ampuls, one containing the dry drug and the other containing the special diluent. The solution is intended for intramuscular injection.

| Dry fill ampul. 5 cc. | (mg.) |
|---|---|
| 7 - chloro - 3,5 - dihydro - 1 - methyl - 5 - phenyl - 4,1-benzothiazepin-2(1H)-one | 25 |

A parenteral grade of the drug, fiber free, was filled into the ampul using a Diehl Mater electric filler or other suitable type filler. The ampuls were sealed and sterilized at 255° F. for 2 hours.

Immediately before use the powder was solubilized with the following solution:

| Special diluent 2 cc. per ml. | (mg.) |
|---|---|
| Benzyl alcohol, U.S.P. | 15.0 |
| Maleic acid | 16.0 |
| Propylene glycol | 207.0 |
| Sodium hydroxide q.s. to pH 3.0. | |
| Water for injection q.s. to 1.0 ml. | |

In a suitable container under an atmosphere of nitrogen, the following were dissolved in part of the water for injection in the following order: propylene glycol, benzyl alcohol, and maleic acid. The solution was made to volume, filtered through an 02 Selas candle filter and filled into 2 cc. flint ampuls. The filling should be done under an atmosphere of nitrogen. The ampuls were sealed and sterilized at 212° F. for 30 minutes. The ampuls were then inspected, and those that leaked or contained fibers were discarded.

EXAMPLE 16

Dosage formulations for 4,1-benzothiazepin-2(1H)-one prepared as described herein are represented by the following.

| Tablet formulation: | Per tablet, mg. |
|---|---|
| 8 - chloro - 3,5 - dihydro - 5 - phenyl - 4,1-benzothiazepin - 2(1H) - one | 25.00 |
| Lactose, U.S.P. | 64.50 |
| Corn starch | 10.00 |
| Magnesium stearate | 0.50 |

Procedure (1) 8-chloro-3,5-dihydro-5-phenyl-4,1 - benzothiazepin-2(1H)-one was mixed with the lactose, corn starch and magnesium stearate in a suitable mixer.

(2) The mixture was further blended by passing through a Fitzpatrick comminuting machine fitted with a No. 1A screen with knives forward.

(3) The mixed powders were slugged on a tablet compressing machine.

(4) The slugs were comminuted to a suitable mesh size (No. 16 screen) and mixed well.

(5) The tablets were compressed at a tablet weight of 100 mg. using tablet punches having a diameter of approximately ¼". (Tablets may be either flat or biconvex and may be scored if desired.)

EXAMPLE 17

Dosage formulations for 4,1-benzothiazepin-2(1H)-one prepared as described herein are represented by the following.

| Capsule formulation: | Per capsule, mg. |
|---|---|
| 8-chloro - 3,5 - dihydro - 5 - phenyl - 4,1 - benzothiazepin-2(1H)-one | 50 |
| Lactose, U.S.P. | 125 |
| Corn starch, U.S.P. | 30 |
| Talc, U.S.P. | 5 |
| Total weight | 210 |

Procedure (1) 8-chloro-3,5-dihydro-5-phenyl-4,1 - benzothiazepin-2(1H)-one was mixed with lactose and corn starch in a suitable mixer.

(2) The mixture was further blended by passing through a Fitzpatrick comminuting machine with a No. 1A screen with knives forward.

(3) The blended powder was returned to the mixer, the talc added and blended thoroughly.

(4) The mixture was filled into No. 4 hard shell gelatin capsules on a Parke Davis capsulating machine.

EXAMPLE 18

Dosage formulations for 4,1-benzothiazepin-2(1H)-one prepared as described herein are represented by the following.

| Suppository formulation: | Per 1.3 gm. suppository, gm. |
|---|---|
| 8-chloro - 3,5 - dihydro - 5 - phenyl-4,1-benzothiazepin-2(1H)-one | 0.025 |
| Wecobee M | 1.230 |
| Carnauba wax | 0.045 |

Procedure (1) The Wecobee M and the carnauba wax were melted in a suitable size glass lined container, mixed well and cooled to 45° C.

(2) 8-chloro-3,5-dihydro-5-phenyl-4,1 - benzothiazepin-2(1H)-one, which had been reduced to a fine powder with no lumps, was stirred until completely and uniformly dispersed.

(3) The mixture was poured into suppository molds to yield suppositories having an individual weight of 1.3 gm.

(4) The suppositories were cooled and removed from molds. They were then individually wrapped in wax paper for packaging.

EXAMPLE 19

Dosage formulations for 4,1-benzothiazepin-2(1H)-one prepared as described herein are represented by the following:

Parenteral formulation

This drug was prepared in duplex ampuls, one containing the dry drug and the other containing the special diluent. The solution is intended for intramuscular injection.

| Dry fill ampul 5 cc. | (mg.) |
|---|---|
| 8-chloro - 3,5 - dihydro - 5 - phenyl - 4,1 - benzothiazepine-2(1H)-one | 25 |

A parenteral grade of the drug, fiber free, was filled into the ampul using a Diehl Mater electric filler or other suitable type filler. The ampuls were sealed and sterilized at 255° F. for 2 hours.

Immediately before use the powder was solubilized with the following solution:

| Special diluent 2 cc. per ml. | (mg.) |
|---|---|
| Benzyl alcohol, U.S.P. | 15.0 |
| Maleic acid | 16.0 |
| Propylene glycol | 207.0 |
| Sodium hydroxide q.s. to pH 3.0. | |
| Water for injection q.s. to 1.0 ml. | |

In a suitable container under at atmosphere of nitrogen, the following were dissolved in part of the water for injection in the following order: propylene, glycol, benzyl alcohol, and maleic acid. The solution was made to volume, filtered through an 02 Selas candle filter and filled into 2 cc. flint ampuls. The filling should be done under an atmosphere of nitrogen. The ampuls were sealed and sterilized at 212° F. for 30 minutes. The ampuls were then inspected, and those that leaked or contained fibers were discarded.

What is claimed is:
1. A compound of the formula

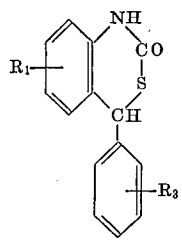

wherein $R_1$ is selected from the group consisting of hydrogen, halogen, lower alkyl and lower alkoxy and $R_3$ is selected from the group consisting of hydrogen and halogen.

2. A compound as defined in claim 1 wherein $R_1$ is halogen and is joined to position-6 of the benzothiazine nucleus and $R_3$ is hydrogen, i.e. a compound of the formula 6-halo-1,4-dihydro-4-phenyl-2H-3,1-benzothiazin-2-one.

3. A compound as defined in claim 2 wherein $R_1$ is chlorine.

4. A compound as defined in claim 1 wherein $R_1$ is halogen and is joined to position-7 of the benzothiazine nucleus and $R_3$ is hydrogen, i.e. a compound of the formula 7-halo-1,4-dihydro-4-phenyl-2H-3,1-benzothiazin-2-one.

5. A compound as defined in claim 4 wherein $R_1$ is chlorine.

6. A compound of the formula

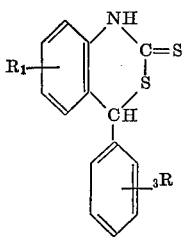

wherein $R_1$ is selected from the group consisting of hydrogen, halogen, lower alkyl and lower alkoxy and $R_3$ is selected from the group consisting of hydrogen and halogen.

7. A compound as defined in claim 6 wherein $R_1$ is halogen and is joined to the benzothiazine nucleus in position 6 and $R_3$ is hydrogen, i.e. a compound of the formula 6 - halo - 1,4 - dihydro-4-phenyl-2H-3,1-benzothiazine-2-thione.

8. A compound as defined in claim 7 wherein $R_1$ is chlorine.

9. A compound as defined in claim 6 wherein $R_1$ is halogen and is joined to the benzothiazine nucleus in position 7 and $R_3$ is hydrogen, i.e. a compound of the formula 7 - halo - 1,4 - dihydro-4-phenyl-2H-3,1-benzothiazine-2-thione.

10. A compound as defined in claim 9 wherein $R_1$ is chlorine.

References Cited

UNITED STATES PATENTS

| 3,188,323 | 6/1965 | Sowinski | 260—327 |
| 3,361,760 | 1/1968 | Krapcho | 260—327 |
| 3,166,554 | 1/1965 | Krapcho | 260—243 |

OTHER REFERENCES

Goerdeler et al., Chemische Berichte, vol. 92, pp. 1679–94 (1959).

Kitamura, Chemical Abstracts, vol. 30, cols., 3434–5 (1936).

HENRY R. JILES, Primary Examiner

JOHN M. FORD, Assistant Examiner

UNITED STATES PATENT OFFICE
CERTIFICATE OF CORRECTION

Patent No. 3,503,966  Dated March 31, 1970

Inventor(s) Werner Metlesics and Leo Henryk Sternbach

It is certified that error appears in the above-identified patent and that said Letters Patent are hereby corrected as shown below:

Column 2, lines 18-25, formula IV -

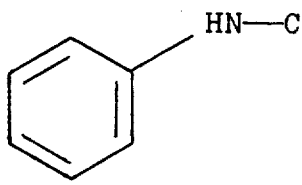   should be   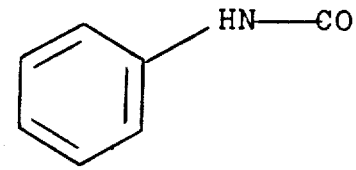

Page 2, lines 19-25 of our specification.

SIGNED AND SEALED
SEP 22 1970

(SEAL)
Attest:

Edward M. Fletcher, Jr.
Attesting Officer

WILLIAM E. SCHUYLER, JR.
Commissioner of Patents